Patented Dec. 19, 1933

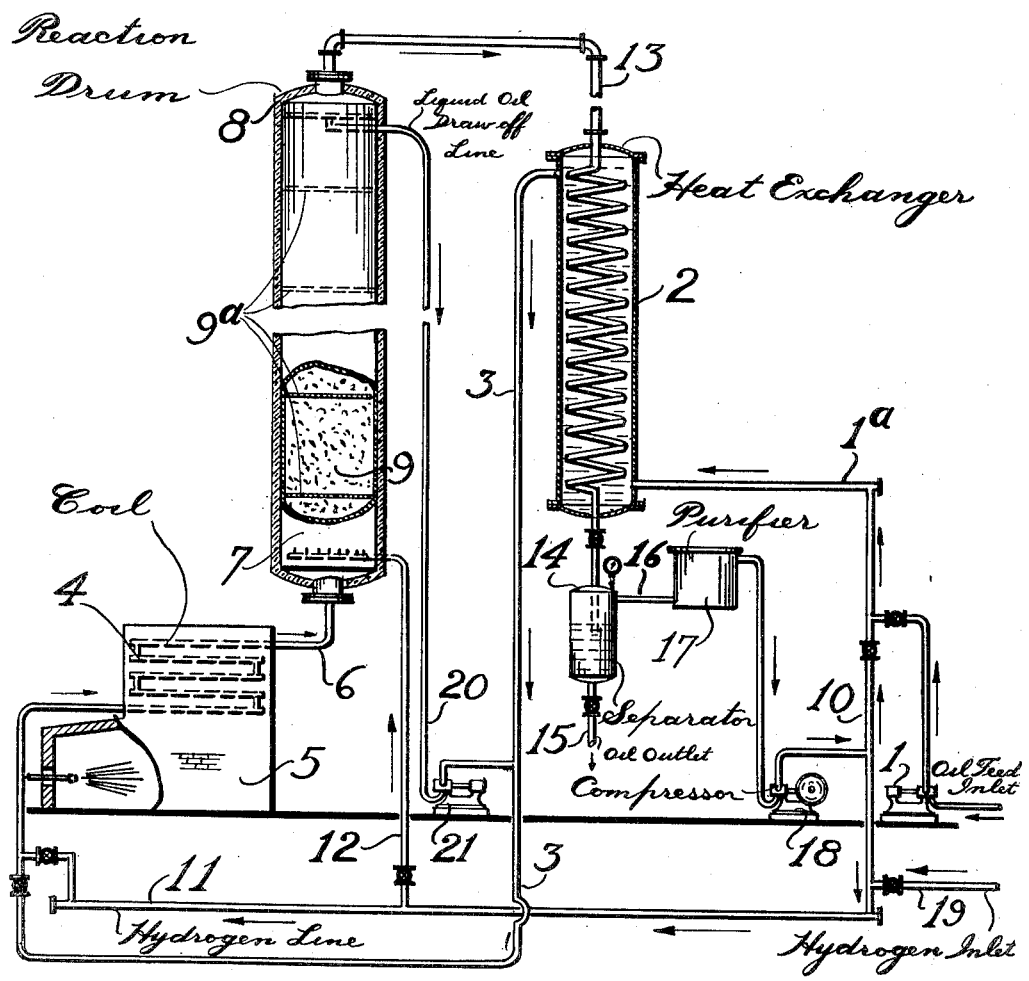

1,940,650

UNITED STATES PATENT OFFICE 1,940,650

PROCESS FOR THE IMPROVEMENT OF HYDROCARBON OILS BY TREATMENT WITH HYDROGEN UNDER ELEVATED TEMPERATURE AND PRESSURE

Robert P. Russell, Elizabeth, N. J., assignor to Standard-I. G. Company

Application April 18, 1930. Serial No. 445,270

7 Claims. (Cl. 196—78)

The present invention relates to a process for improving hydrocarbon oils by treatment with hydrogen under elevated temperature and pressure. My invention will be fully understood from the following description and drawing, which illustrates one form of apparatus suitable for carrying out my invention.

The drawing is a sectional elevation diagrammatically showing an apparatus constructed to carry out my invention and indicates the flow of the various materials in the process.

Referring to the drawing a hydrocarbon oil is fed from any convenient source by pump 1 through heat exchanger 2 and line 3 into coil 4. The heating coil is suitably mounted in setting 5 and discharges through line 6 into reaction drum 7. The drum is constructed to withstand temperatures in the neighborhood of 750 to 850° F. or higher and pressures of 200 atmospheres or higher and is provided with suitable insulation 8. The interior of the drum is filled with a catalytic material 9 which is packed into the drum in any suitable manner, for example in small lumps. The screens or perforated partitions 9a are placed in the drum as shown to prevent the catalyst from being swept out of the drum by the velocity of oil and may also be used to support the catalyst against its own weight or against the pressure imposed by the rapidly flowing materials in the drum. Hydrogen is supplied under pressure in line 10 and may be passed to line 1a to follow the feed oil through to the drum. Additional hydrogen may be added to the drum through line 12 or to the coil inlet through line 11. The hydrogen and oil pass up simultaneously through the catalytic bed 9, and in order to maintain a high liquid velocity in this catalytic zone a portion of the liquid oil is drawn off at the top of the drum by pump 21 through line 20 for recycling back with the fresh feed through line 3. The remainder of the liquid oil passes off as product with the hydrogen through line 13. It should be understood, however, that I may obtain the same velocity effect by use of a drum of small diameter compared to its length, in which case no pump is required and all the oil leaves the drum through line 13 The material in line 13 passes to condenser 2 where liquid oil and hydrogen are cooled and a small percentage of light oils formed in the process are condensed out. Passing to separator 14, the liquid oils are withdrawn through line 15 to storage (not shown) and the gas is removed preferably under pressure by line 16 to a purification system 17. The purification may be carried out using any convenient means, such as scrubbing with heavy oils under pressure to remove hydrogen sulfide and the major quantity of gaseous hydrocarbons. Purified gas flows to booster compressor 18 from which it is discharged into line 10 for recirculation. Fresh or makeup hydrogen may be added through line 19.

In the operation of this improved process the feed stock consists of hydrocarbon oils which may be finished or unfinished, that is to say which have or have not been previously treated with acid, soda or clay, which are pressed or unpressed and which may be distillates containing little or no asphaltic materials or may be residual oils. The feed is heated preferably with hydrogen to a decomposition temperature not exceeding 830° F. by rapid passage through a heated coil at a high rate sufficient to prevent substantial decomposition. The heated mixture then passes under high pressure through a reaction drum packed with a suitable catalyst which may comprise the oxides or sulfides of such materials as chromium, molybdenum or tungsten, their mixtures with each other or with other compounds such as zinc oxide, magnesia, lime or alumina, these being characterized by resistance to sulfur. The drum is preferably maintained at a temperature not in excess of 830° F. and ordinarily in the range between 750 and 810° F., the heat of coil 4 and the heat of the reaction being sufficient to maintain the temperature of the drum which is suitably insulated. The pressure is held above 20 atmospheres and preferably in excess of 100 or 200 atmospheres and may be as high as 1000 atmospheres or more. An excess of hydrogen is used, preferably in the ratio of about 5000 to 10,000 cubic feet of hydrogen per barrel of oil fed to the process. In its flow through the catalytic mass, reaction takes place between the hydrogen and the oil, thereby yielding oils of high quality as regards flash, sulfur content, asphaltic content, and color, and which possess temperature-viscosity relationships tending toward those of Pennsylvania petroleum as distinguished from oils of the Coastal and Texas class. This latter distinction may be more readily understood by reference to an article by Dean and Davis in "Chemical and Metallurgical Engineering" vol. 36, page 618, in which oils are given a "viscosity index" number as a measure of the relative flatness of their temperature viscosity curves. In this classification Pennsylvania oils possess excellent viscosity index numbers in the range from 90 to 100, while low grade oils such as Coastal oils have a viscosity index between 10 and 30. A small amount of light oils boiling below 400° F. is formed in the process as side reaction products, but do not ordinarily amount to more than about 10 to 15 percent of the feed. The feed rate used in the process is expressed in terms of the volume of the reaction chamber and ordinarily is held between 0.3 and 1.2 volumes of oil per volume of reaction space per hour, the poorer quality feed oil requiring more time than higher grade oils to produce equivalent products.

I have found in the operation of the process that the mass velocity with which the oil is passed over the catalyst is of importance in obtaining maximum yields of high quality oils, as well as high throughputs per unit volume of reactor space. If the mass velocity is too low, 5 to 10 or even 15% less oil of a definite quality is obtained and a throughput, 10 to 30 or even 50% lower is necessary. As the mass velocity of the oil through the catalyst bed is increased, the throughput may be raised and the yield of a given quality oil increases. I have found that this velocity should be in excess of about 0.25 pounds of oil per square foot of reaction drum cross section, and that increasingly improved results are obtained as the velocity is raised, for example to 1.0, 3.0 or even 5.0 pounds per second per square foot. Velocities in excess of this may be used with excellent results, but the advantage gained is ordinarily offset by the increased cost of pumping, higher pressure drop, and the possibility that the catalyst may be eroded and crushed by excessive velocities. It will be understood that I may secure high velocity through the catalytic zone in a variety of ways, for example I may rapidly recycle a part of the oil through the drum by means of a pump, taking off a finished product from the system in an amount substantially equal to the fresh feed where a continuous system is used as illustrated. Similarly, I may construct the reaction chamber of small diameter compared to its volume, so that a high mass velocity is obtained without recycle pumping, or I may use other suitable means such as baffle walls to cause two or more passes, or space filling cores inside the reactors, as will be understood.

As an example of the operation of my process and of the effect of mass velocity of oil through the catalyst bed a Colombia lubricating oil distillate having the following inspection is fed to the apparatus:

Gravity_____ 21.7° A.P.I.
Vis. at 100° F_____ 662 sec. Saybolt
Vis. at 210° F_____ 60 sec. Saybolt
Flash_____ 390° F.

A catalyst consisting of the oxides of molybdenum, chromium and zinc is used in the reactor in lump form of 2 to 4 mesh and the oil is fed at a rate of 0.33 volumes of oil per volume of reactor per hour with an amount of hydrogen equivalent to 6800 cubic feet per barrel of oil. The unit is operated at such a temperature as is necessary to produce the maximum amount of oil of 405° F. flash and 50 seconds Saybolt viscosity at 100° F. Two runs are made, one with a mass velocity of 2.8 pounds of oil per second per square foot of reactor cross section, and a second with a mass velocity of 0.04. The results are as follows:

|  | I | II |
|---|---|---|
| Conditions of operation |  |  |
| Mass velocity—#/sec./sq. ft. | 2.8 | 0.04 |
| Reactor temp.—° F. | 766 | 782 |
| Feed rate—vol./reactor/hr. | 0.33 | 0.33 |
| Hydrogen—cu.ft./bbl.oil | 6800 | 6800 |
| Inspection of product |  |  |
| Oil of 50 vis. @ 210° F. (Saybolt) |  |  |
| Percent yield on feed | 64 | 58 |
| Flash—° F. | 400 | 405 |
| Gravity—° A.P.I. | 27.3 | 27.3 |
| Oil of 60 visc. @ 210° F. (Saybolt) |  |  |
| Percent yield on feed | 35 | 32 |
| Flash—° F. | 450 | 455 |
| Gravity—° A.P.I. | 27.3 | 27.4 |

A consideration of the results tabulated above shows that 6% more of a 50 seconds Saybolt viscosity oil of the same quality (as shown by the flash) is obtained with the higher mass velocity. The 60 seconds Saybolt viscosity oil shows a corresponding relation. In addition to this it is possible to operate with a temperature 16° F. lower when the higher velocity is used.

In a similar manner an additional pair of runs is made using a Colombia lubricating oil distillate of the following inspection:

Gravity_____ 22.1° A. P. I.
Vis. at 100° F_____ 617 sec. Saybolt
Vis. at 210° F_____ 60 sec. Saybolt
Flash_____ 430° F.

A catalyst of the same composition as given in the previous example is employed in the reactor together with a similar excess of hydrogen, namely about 6800 cubic feet per barrel of oil. In each run the reactor temperature is held at 790° F. and the feed rate is adjusted to produce the maximum amount of oil at 420° F. flash and 50 seconds Saybolt viscosity at 100° F. One run is made with a mass velocity of 0.04, the other with a velocity of 0.7. The results are as follows:

|  | III | IV |
|---|---|---|
| Conditions of operation |  |  |
| Mass velocity—#/sec./sq.ft. | 0.7 | 0.04 |
| Reactor temp.—° F. | 790 | 790 |
| Feed rate—vol./vol. reactor/hr. | 0.5 | 0.33 |
| Hydrogen—cu.ft./bbl. oil | 6800 | 6800 |
| Inspections of Product |  |  |
| Oil of 50 vis. @ 210° F. (Saybolt) |  |  |
| Percent yield on feed | 52 | 47 |
| Flash ° F. | 425 | 435 |
| Gravity ° A.P.I. | 27.9 | 27.9 |
| Oil of 68 vis. @ 210° F. (Saybolt) |  |  |
| Percent yield on feed | 12 | 9 |
| Flash ° F. | 520 | 520 |
| Gravity—° A.P.I. | 27.5 | 27.5 |

Runs III and IV illustrate the point that by using a higher mass velocity through the catalyst bed it is possible to attain higher throughputs from the reactor when a definite temperature is maintained. The feed rate in run III is 50% higher than in run IV and somewhat better yields of oils of the desired viscosities are obtained.

This invention is of particular importance in processes where oils are improved in quality without substantial formation of low boiling oils, for example in the improvement of lubricating oils. This type of treatment, which employs temperatures usually between 750 and 810° F., has been used as the illustration in this specification. However, my invention may also be applied in a process such as set forth in my co-pending application "Improved process for producing low boiling oils from high boiling oils by action of hydrogen at elevated temperatures," Serial No. 438,405, filed March 24, 1930. In this process large amounts of low boiling oils are produced, and temperatures from about 850 to 910° F. are employed.

This invention is not to be limited by any theory of the mechanism of the reactions nor to any specific example which may have been given for purpose of illustration, but only by the following claims in which I wish to claim all novelty inherent in my invention.

I claim:

1. In a process for the treatment of heavy hydrocarbon oils by destructive hydrogenation in order to produce improved lubricating oils the steps of subjecting the oil to the action of hydrogen in a rection zone packed with a catalyst maintained at temperatures above 700° F. and under pressures of at least 20 atmospheres and causing a steady flow of oil to pass continuously in one direction through the catalyst at an absolute velocity above about 0.25 pounds per second per square foot of reaction zone cross section, the time of contact being adapted to produce improved lubricating oils together with the formation of an appreciable but limited amount of naphtha.

2. Process according to claim 1 in which the oil and hydrogen are preheated and passed continuously through the reaction zone.

3. An improved process for producing improved lubricants from heavy hydrocarbon oil by destructive hydrogenation comprising passing the oil and hydrogen under pressure of at least 50 atmospheres through a reaction zone packed with suitable catalytic material maintained in the reaction zone at a temperature within limits of 700 and 800° F. and causing a steady continuous flow of oil to pass continuously in one direction through the zone at a velocity above about 0.75 pounds per second per square foot of reaction zone cross section, the time of contact being sufficient to improve the oil with an appreciable but limited formation of naphtha.

4. Process according to claim 3 in which liquid oil is continuously removed and a part thereof is repassed through the reactor to maintain a high velocity.

5. An improved process for producing higher grade lubricating oil from heavy lower grade petroleum fractions by destructive hydrogenation comprising passing the oil continuously in one direction with hydrogen under a pressure above 20 atmospheres and at temperatures between 700 and 810° F. through a body of a suitable catalytic material and interadjusting time of contact, temperature, and velocity of the oil through the body of catalyst whereby substantially the maximum yield of lubricating oil of the viscosity and improved quality desired is produced together with an appreciable but limited amount of light oil.

6. Process according to claim 5 in which the time of contact is between the limits of 0.3 and 1.0 volumes of oil per volume of reactor space per hour.

7. Process according to claim 5 in which the velocity is above about 1.0 pounds per second per square foot of reaction zone cross section.

ROBERT P. RUSSELL.